(No Model.)
P. THACHER.
Belt Fastener.
No. 238,009. Patented Feb. 22, 1881.
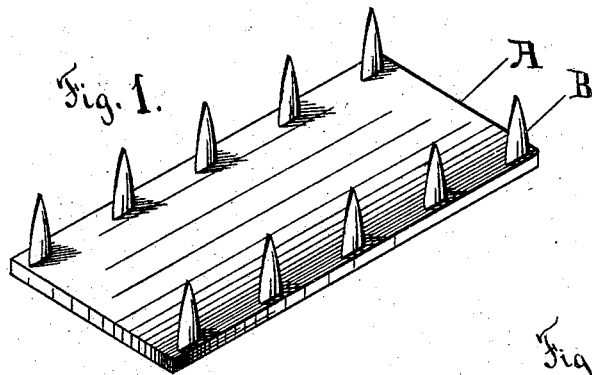
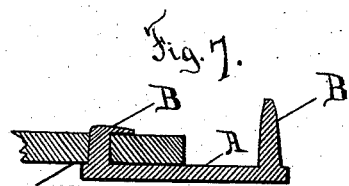
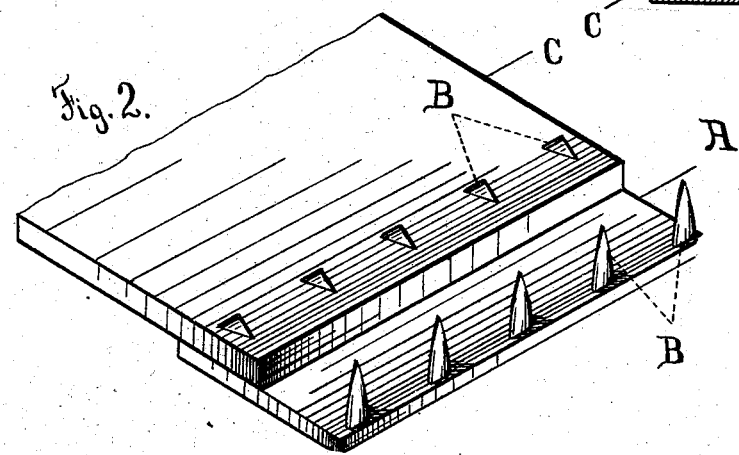
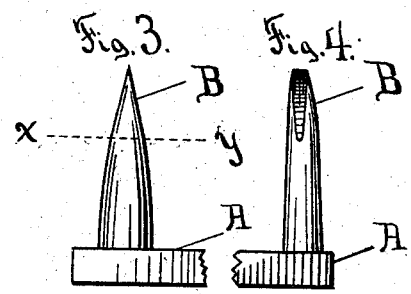
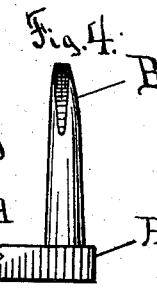
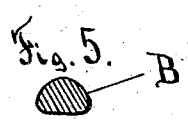
WITNESSES
A. L. Lord
W. E. Connelly
INVENTOR
Peter Thacher
By Leggett & Leggett
ATTORNEYS

UNITED STATES PATENT OFFICE.

PETER THACHER, OF CLEVELAND, OHIO.

BELT-FASTENER.

SPECIFICATION forming part of Letters Patent No. 238,009, dated February 22, 1881.

Application filed November 10, 1880. (No model.)

*To all whom it may concern:*

Be it known that I, PETER THACHER, of Cleveland, in the county of Cuyahoga and State of Ohio, have invented certain new and useful Improvements in Belt-Fasteners; and I do hereby declare the following to be a full, clear, and exact description of the invention, such as will enable others skilled in the art to which it pertains to make and use it, reference being had to the accompanying drawings, which form part of this specification.

My invention relates to belt-fasteners, and more particularly to that class having a plate to which are attached teeth or series of teeth adapted to pass through the belt and clinched upon the opposite side; and it consists in an improved tooth, and also in parts and combination of parts, as will more fully hereinafter appear.

In the drawings, Figure 1 is a view, in perspective, of a belt-fastener constructed according to my invention. Fig. 2 is a view of the same with one side attached to the end of a belt, as adapted for use. Fig. 3 is a view, in front elevation, of a tooth made in accordance with my invention. Fig. 4 is an end view of the same tooth. Fig. 5 is a view, in cross-section, of a tooth constructed according to my invention at its point of contact with the plate. Fig. 6 is a view, in cross-section, of a tooth on the line *x y* of Fig. 3.

In the said drawings, A represents a plate, preferably made of metal, having upon its two opposite edges one or more rows of teeth, B. These series of teeth may be continued indefinitely across the face of the plate.

As shown in Figs. 3, 4, 5, and 6 of the drawings, my tooth is formed preferably of the cylindrical or elliptical shape at its base, gradually tapering toward its point, the inner face of the tooth being somewhat flattened. I find for this construction of tooth that it is less liable to split the leather as it passes through it; also, the point presents two opposite flat surfaces, which makes it easy to drive the same through the leather, and also makes it easy to be clinched. In speaking of the "width" of the plate I mean by that the direction across the plate in which the tractive action of the belt is exerted upon the plate in use, and the direction across the plate at right angles to such width is spoken of herein as the length of the plate. In placing these teeth upon this plate their widest portions lie in the direction of the length of the plate.

This belt-fastener is preferably constructed of malleable iron, the width of the plate varying with the width of the belt to which it is proposed to attach it, the length of the teeth varying as the thickness of the belt. The use of this plate is indicated by Fig. 2 of the drawings, in which is shown the plate attached to one end of a belt with the points turned or clinched upon the belt.

Fig. 7 is a view in cross-section of my device with one tooth clinched, showing the manner of clinching the teeth.

Having thus described my device, what I claim is—

A belt-fastener consisting of a plate furnished with a series of teeth each of which is made elliptical in cross-section at its base and gradually tapering to its point, the latter being made with flat sides, said teeth being arranged on the plate so that the widest portions of the teeth shall be at right angles to the length of the belt, substantially as set forth.

In testimony whereof I have signed my name to this specification in the presence of two subscribing witnesses.

PETER THACHER.

Witnesses:
 JNO. CROWELL, Jr.,
 ALBERT E. LYNCH.